No. 111,751.  PATENTED FEB. 14, 1871.
R. A. KELTY.
RUBBER ROLLER FOR PAPER MACHINES.
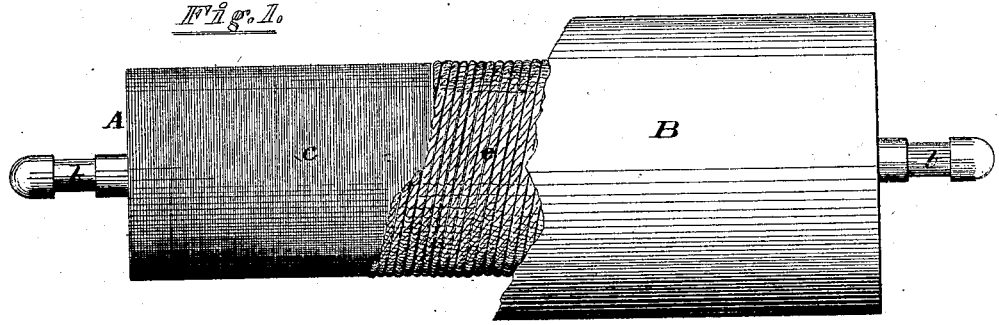
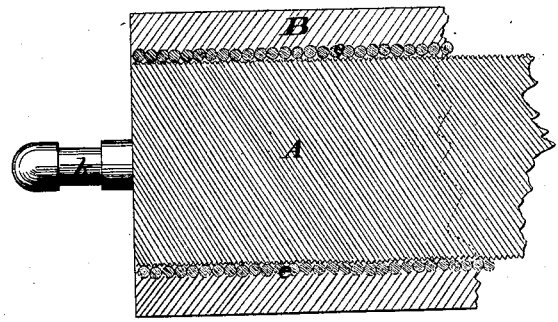
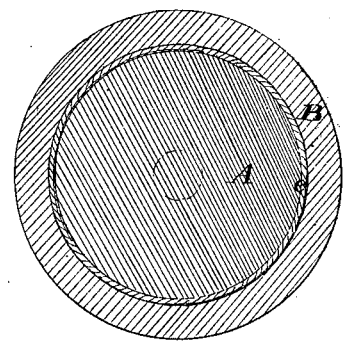
Witnesses.
Inventor:
Richard A. Kelty,
Chipman Hosmer & Co.,
Attorneys.

United States Patent Office.

RICHARD A. KELTY, OF LAMBERTSVILLE, NEW JERSEY.

Letters Patent No. 111,751, dated February 14, 1871; antedated January 30, 1871.

IMPROVEMENT IN RUBBER ROLLERS FOR PAPER-MACHINES.

The Schedule referred to in these Letters Patent and making part of the same.

*To all whom it may concern:*

Be it known that I, RICHARD A. KELTY, of Lambertsville, in the county of Hunterdon and State of New Jersey, have invented a new and valuable Improvement in Rollers for Paper-Making Machines; and I do hereby declare that the following is a full, clear, and exact description of the construction and operation of the same, reference being had to the annexed drawing making a part of this specification, and to the letters and figures of reference marked thereon.

Figure 1 of the drawing is a side view of my roller, with a portion of the rubber removed;

Figure 2 is a central longitudinal section; and

Figure 3 is a cross-section thereof.

My invention has relation to an improvement in machines for the manufacture of paper, and consists in the novel construction of rubber rollers for couching and pressing the pulp.

The cylindrical surface of the metallic core is transversely and continuously corrugated or otherwise roughened, and the rubber covering is lined with inelastic substance, ribbed transversely, the ribs of the lining being made considerably larger in diameter than the width of the depressions or channels of the metal cylinder.

The letter A of the drawing represents the inner cylinder or core of metal.

This cylinder constitutes the body of the roller, and is provided with the journals *b b*.

The cylindrical surface *c* of the roller is transversely ribbed, in the manner shown, or otherwise roughened, to increase the friction of contact.

Care must be taken that the inequalities which compose the roughened or corrugated surface shall be fine in degree, homogeneous, and uniformly extended throughout the whole cylindrical surface of the metallic core.

B represents the rubber incasement or covering, to which is attached the transversely-ribbed lining *e*.

Usually, in the manufacture of my rollers, I prefer to wind or coil around the core a stout and hard cord.

This is then coated with cement, and the whole afterward incased by the rubber cylinder, which is molded thereon.

In order to understand fully the object and advantage of this mode of construction, it is necessary to state that the rollers of a paper-making machine are of large size, usually weighing upward of a thousand pounds, and they are worked under great pressure.

The metallic core composes the chief bulk of the roller, and the rubber covering is merely a thin coating of this material, which is peculiarly adapted to the purpose of rolling out the paper-pulp.

The thickness of rubber and inelastic lining together is usually less than one-twelfth of the radius of the roll.

Under the great pressure of the upper roller, the tendency of the thin rubber coating is to work up in front of the line of contact, and, becoming loose, to work off endwise.

Any undue irregularity in the cylindrical surface of the metallic core would also, under pressure, cause a corresponding inequality in the sheet of paper produced, as the surface of the rubber coating would be affected thereby.

Hence, I have designed this mode of constructing these rollers.

A suitable friction surface is first formed on the metallic core, care being taken that the inequalities thereof shall be uniformly extended over the surface, and that they shall be so fine in degree that the ribs or cords of the next layer shall not sink into the depressions when under pressure, in such a manner as to cause an inequality in the degrees of density of the rubber rolling-surface, at different points thereof.

The inelastic layer or cord-coil next is arranged to envelop continuously the metal cylinder. It serves to prevent the working up of the rubber coating under pressure, to prevent any longitudinal movement by the engagement of its transverse ribs, both with the corrugations of the core and also with the rubber coating by which it is enveloped, to gradually decrease the density of the roll toward its surface, and to act as a guard or deadening layer between the corrugations of the metallic core and the more sensitive rubber coating.

The connection between the metal core and the rubber cylinder or coating hereby attained is thought to be most intimate, while the delicate and true surface of the roll is nowise impaired under the great pressure employed in a paper-making machine.

I am aware that a roller for a wringing-machine has been described by John F. Holt in his Letters Patent No. 49,030, dated July 25, 1865, and reissued April 19, 1870, showing the rubber cylinder confined by its attachment to a sheet of rubber bound on the mandrel by a cord, which is arranged to lie in a deep groove, formed spirally around the mandrel for this purpose.

Such a mode of construction seems designed to answer an admirable purpose in a wringer-roll, where nice equality of surface is not of paramount importance, but I make no claim thereto.

What I claim as my invention, and desire to secure by Letters Patent, is—

The roller, herein described, consisting of the transversely-corrugated or roughened metallic core A, the rubber cylinder B, and the ribbed lining or continuous cord-coil c, substantially as specified.

In testimony that I claim the above I have hereunto subscribed my name in the presence of two witnesses.

RICHARD A. KELTY.

Witnesses:
CHAS. A. SKILLMAN,
CHAS. BLACKWELL.